United States Patent
Furusawa

(10) Patent No.: US 11,168,760 B2
(45) Date of Patent: Nov. 9, 2021

(54) WATER-BASED TREATMENT AGENT FOR FORMING RUBBER-REINFORCING CORD, RUBBER-REINFORCING CORD FORMED USING SAME AND PRODUCTION METHOD THEREFOR, AND RUBBER PRODUCT EMPLOYING RUBBER-REINFORCING CORD

(71) Applicant: Nippon Sheet Glass Company, Limited, Tokyo (JP)

(72) Inventor: Masamori Furusawa, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 1304 days.

(21) Appl. No.: 15/103,081

(22) PCT Filed: Dec. 24, 2014

(86) PCT No.: PCT/JP2014/006437
§ 371 (c)(1),
(2) Date: Jun. 9, 2016

(87) PCT Pub. No.: WO2015/098105
PCT Pub. Date: Jul. 2, 2015

(65) Prior Publication Data
US 2016/0377149 A1 Dec. 29, 2016

(30) Foreign Application Priority Data

Dec. 25, 2013 (JP) .............................. JP2013-266774

(51) Int. Cl.
*F16G 5/08* (2006.01)
*F16G 1/28* (2006.01)
(Continued)

(52) U.S. Cl.
CPC .............. *F16G 5/08* (2013.01); *D06M 15/693* (2013.01); *F16G 1/10* (2013.01); *F16G 1/28* (2013.01); *F16G 5/20* (2013.01)

(58) Field of Classification Search
CPC ........ B29D 29/08; D06M 15/693; F16G 5/08; F16G 5/20; F16G 1/10; F16G 1/28
See application file for complete search history.

(56) References Cited

U.S. PATENT DOCUMENTS

| | | | |
|---|---|---|---|
| 8,222,328 | B2 | 7/2012 | Akiyama et al. |
| 8,911,863 | B2 | 12/2014 | Matsumoto et al. |

(Continued)

FOREIGN PATENT DOCUMENTS

| | | |
|---|---|---|
| EP | 2719824 A1 | 4/2014 |
| JP | 1-207480 | 8/1989 |

(Continued)

OTHER PUBLICATIONS

Extended European Search Report issued for corresponding European Patent Application No. 14874899.9, dated Aug. 2, 2017, 6 pages.

*Primary Examiner* — Jennifer A Boyd
*Assistant Examiner* — Ricardo E Lopez
(74) *Attorney, Agent, or Firm* — Hamre, Schumann, Mueller & Larson, P.C.

(57) ABSTRACT

It is an object to improve the anti-fraying properties of rubber-reinforcing cords without significant reduction in productivity. The present invention provides a water-based treatment agent for forming a rubber-reinforcing cord having a coating. The water-based treatment agent includes a rubber latex, a crosslinking agent, and a filler. A content of the crosslinking agent is 50 parts by mass or more and 150 parts by mass or less per 100 parts by mass of solids contained in the rubber latex, and a content of the filler is (Continued)

more than 50 parts by mass and 80 parts by mass or less per 100 parts by mass of the solids contained in the rubber latex.

15 Claims, 1 Drawing Sheet

(51) Int. Cl.
  *F16G 1/10* (2006.01)
  *F16G 5/20* (2006.01)
  *D06M 15/693* (2006.01)

(56) References Cited

U.S. PATENT DOCUMENTS

| | | | |
|---|---|---|---|
| 8,962,129 | B2 | 2/2015 | Tai et al. |
| 2006/0063884 | A1 | 3/2006 | Akiyama |
| 2008/0032130 | A1* | 2/2008 | Akiyama .................. C08J 5/06 428/375 |
| 2008/0271638 | A1* | 11/2008 | Akiyama ............... B29D 29/08 106/242 |

FOREIGN PATENT DOCUMENTS

| | | |
|---|---|---|
| JP | 6-025977 | 2/1994 |
| JP | 7-502064 | 3/1995 |
| JP | 8-284069 | 10/1996 |
| JP | 11-279949 | 10/1999 |
| JP | 3070613 B | 7/2000 |
| JP | 3187256 B | 7/2001 |
| JP | 2002-509966 | 4/2002 |
| JP | 2004-183121 | 7/2004 |
| JP | 2007-154382 | 6/2007 |
| JP | 2008-196103 | 8/2008 |
| JP | 2010-001570 | 1/2010 |
| JP | 4460581 B | 5/2010 |
| JP | 2013-170333 | 9/2013 |
| WO | 93/12189 | 6/1993 |
| WO | 99/50342 | 10/1999 |
| WO | 2006/001385 | 1/2006 |
| WO | 2008/041615 | 4/2008 |
| WO | 2008/146708 | 12/2008 |

\* cited by examiner

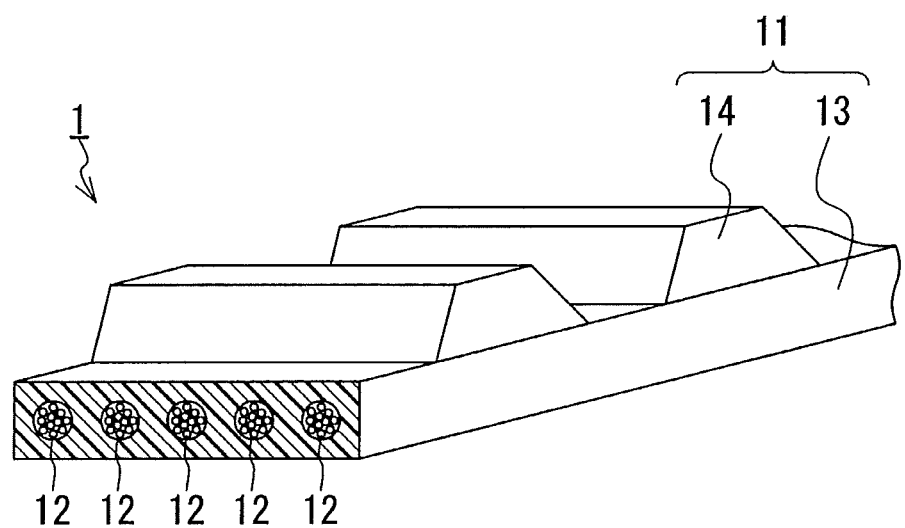

WATER-BASED TREATMENT AGENT FOR FORMING RUBBER-REINFORCING CORD, RUBBER-REINFORCING CORD FORMED USING SAME AND PRODUCTION METHOD THEREFOR, AND RUBBER PRODUCT EMPLOYING RUBBER-REINFORCING CORD

TECHNICAL FIELD

The present invention relates to a water-based treatment agent for forming a rubber-reinforcing cord, a rubber-reinforcing cord formed using the water-based treatment agent, a method for producing the rubber-reinforcing cord, and a rubber product including the rubber-reinforcing cord.

BACKGROUND ART

Rubber-reinforcing cords including strong fibers such as aramid fibers are widely used as reinforcing members in rubber products such as rubber belts and tires which are repeatedly subjected to bending stress. The rubber-reinforcing cords are required to have high bending fatigue resistance and high dimensional stability.

A rubber product including such a reinforcing cord may suffer from fraying of the reinforcing cord on an edge surface of the rubber product. For example, a toothed belt, such as a timing belt typically used for driving a cam shaft of an internal combustion engine, poses a problem in that the belt has a reinforcing cord exposed on its side surface inevitably due to the production process, and the exposed portion of the reinforcing cord is likely to undergo fraying, leading to protrusion of the fibers from the edge surface of the belt. This may result in a defect such as a reduction in durability of the rubber product. Reinforcing cords resistant to fraying have therefore been pursued.

For example, Patent Literature 1 proposes an aramid fiber cord that resists fraying when incorporated in a belt (aramid fiber cord having excellent anti-fraying properties), the aramid fiber cord being produced by: treating substantially-untwisted aramid fibers with a treatment solution containing an epoxy compound; subjecting the aramid fibers to a heat treatment followed by twisting; impregnating the twisted aramid fibers with a treatment solution containing a resorcinol-formaldehyde-rubber latex (RFL) under vacuum and pressure; and further subjecting the aramid fibers to a heat treatment and a treatment with a treatment solution containing RFL.

Patent Literature 2 proposes an aramid fiber cord having excellent anti-fraying properties, the aramid fiber cord being produced by: treating substantially-untwisted aramid fibers with a treatment solution containing an epoxy compound; subjecting the aramid fibers to a heat treatment followed by twisting performed simultaneously with application of a treatment solution containing RFL; and further subjecting the aramid fibers to a heat treatment and a treatment with a treatment solution containing RFL.

Patent Literature 3 proposes an aramid fiber cord having excellent anti-fraying properties, the aramid fiber cord being produced by treating aramid fibers with a treatment solution containing an isocyanate compound and/or an epoxy compound and then dipping the aramid fibers in a RFL-containing treatment solution vibrated with an ultrasonic transducer.

Patent Literature 4 discloses a method for producing an aramid core wire, the method including the step of coating or impregnating aramid fiber yarns with a treatment agent containing RFL and a water-soluble epoxy compound.

Patent Literature 5 to 7 each disclose a method for producing an aramid fiber cord having excellent anti-fraying properties. Patent Literature 5, Patent Literature 6, and Patent Literature 7 employ a treatment with a treatment agent containing an epoxy resin and a rubber latex, a treatment with a rubber latex, and a treatment with a treatment agent containing polyepoxide, respectively, and these treatments are followed by a treatment with a treatment agent containing RFL.

Patent Literature 8 discloses a method for producing an aramid fiber cord for reinforcing a rubber belt, the method including applying a water-soluble adhesive containing 5 to 50 mass % of carbon black in terms of mass ratio of solids to untwisted aramid fibers and then twisting the aramid fibers.

Patent Literature 9, which puts no particular emphasis on the anti-fraying properties of an aramid fiber cord, discloses a technique that uses a treatment agent containing at least one crosslinking agent selected from a diisocyanate compound, an aromatic nitroso compound, and a maleimide crosslinking agent and in which strands are chemically bonded together.

CITATION LIST

Patent Literature

Patent Literature 1: JP 3187256 B2
Patent Literature 2: JP 8-284069 A
Patent Literature 3: JP 11-279949 A
Patent Literature 4; JP 2013-170333 A
Patent Literature 5: JP 1-207480 A
Patent Literature 6: JP 3070613 B2
Patent Literature 7: JP 06-25977 A
Patent Literature 8: JP 2010-1570 A
Patent Literature 9: JP 4460581 B2

SUMMARY OF INVENTION

Technical Problem

The production methods disclosed in Patent Literature 1 to 3 cannot be considered to have high productivity because they require a treatment under vacuum and pressure, a treatment with RFL performed simultaneously with twisting, or vibration applied by an ultrasonic transducer.

The inventions disclosed in Patent Literature 4 to 9 achieve an improvement in productivity indeed; however, the resulting rubber-reinforcing cords have insufficient anti-fraying properties and require further improvement.

It is therefore an object of the prevent invention to improve the anti-fraying properties of rubber-reinforcing cords without significant reduction in productivity.

Solution to Problem

The present invention provides a water-based treatment agent for forming a rubber-reinforcing cord having a coating. The water-based treatment agent includes a rubber latex, a crosslinking agent, and a filler. A content of the crosslinking agent is 50 parts by mass or more and 150 parts by mass or less per 100 parts by mass of solids contained in the rubber latex, and a content of the filler is more than 50 parts by mass and 80 parts by mass or less per 100 parts by mass of the solids contained in the rubber latex.

In another aspect, the present invention provides a rubber-reinforcing cord for reinforcing a rubber product. The rubber-reinforcing cord includes at least one strand, and the strand includes at least one filament bundle and a first coating formed at least on a surface of the filament bundle, the first coating being formed using the water-based treatment agent of the present invention.

In another aspect, the present invention provides a method for producing a rubber-reinforcing cord, including a step (i) of: assembling filaments into a filament bundle; applying the water-based treatment agent of the present invention at least to a surface of the filament bundle; drying the applied water-based treatment agent into a first coating to form a strand; and twisting two or more pieces of the strand together into a cord.

In still another aspect, the present invention provides a rubber product including a rubber composition and a rubber-reinforcing cord embedded in the rubber composition. The rubber-reinforcing cord is the rubber-reinforcing cord of the present invention.

Advantageous Effects of Invention

The water-based treatment agent of the present invention allows improvement in the anti-fraying properties of rubber-reinforcing cords without significant reduction in productivity. The rubber-reinforcing cord of the present invention has improved anti-fraying properties. The rubber product of the present invention is less likely to suffer from fraying of a rubber-reinforcing cord included in the rubber product.

BRIEF DESCRIPTION OF DRAWING

FIG. 1 is a schematic diagram showing an exemplary rubber belt according to the present invention.

DESCRIPTION OF EMBODIMENTS

Embodiments of the present invention will now be described. The following description discusses the embodiments of the present invention by way of examples. It should be noted that the present invention is not limited to the examples presented below. The following description mentions some specific values and materials as examples; however, other values or materials may be employed as long as the effects of the present invention are achieved. The compounds described below may be used alone or in combination with each other, unless otherwise specified.

[Water-Based Treatment Agent]

The water-based treatment agent of the present embodiment is used to form a reinforcing cord having a coating, the coating being formed of the water-based treatment agent. The water-based treatment agent of the present embodiment used to form the coating may hereinafter be referred to as "water-based treatment agent (A)". The water-based treatment agent (A) includes a rubber latex, a crosslinking agent, and a filler. The content of the crosslinking agent is 50 parts by mass or more and 150 parts by mass or less per 100 parts by mass of solids contained in the rubber latex, and the content of the filler is more than 50 parts by mass and 80 parts by mass or less per 100 parts by mass of the solids contained in the rubber latex.

The rubber latex is preferably a latex of at least one rubber selected from the group consisting of nitrile rubber, hydrogenated nitrile rubber, carboxyl-modified nitrile rubber, and carboxyl-modified hydrogenated nitrile rubber. The water-based treatment agent (A) may include only one of these rubber latexes or include two or more thereof. These rubber latexes are preferable because they swell less with oil and have high oil resistance. The term "nitrile rubber" as used herein refers to nitrile rubber (acrylonitrile-butadiene copolymer rubber) that is neither hydrogenated nor carboxyl-modified, unless otherwise specified.

The hydrogenated nitrile rubber may have an iodine value of 120 or less, particularly 100 or less. The iodine value of an example of the hydrogenated nitrile rubber is 0 to 50.

The water-based treatment agent (A) may further include another rubber latex in addition to the above rubber latex. Examples of the other rubber latex include a butadiene-styrene copolymer latex, a dicarboxylated butadiene-styrene copolymer latex, a vinylpyridine-butadiene-styrene terpolymer latex, a chloroprene latex, a butadiene latex, and a chlorosulfonated polyethylene latex. The water-based treatment agent (A) may include two or more of these rubber latexes.

Examples of the crosslinking agent include: quinone dioxime crosslinking agents such as P-quinone dioxime; methacrylate crosslinking agents such as lauryl methacrylate and methyl methacrylate; allyl crosslinking agents such as diallyl fumarate (DAF), diallyl phthalate (DAP), triallyl cyanurate (TAC), and triallyl isocyanurate (TAIL); maleimide crosslinking agents such as bismaleimide, phenylmaleimide, and N,N'-m-phenylenedimaleimide; aromatic or aliphatic organic diisocyanates; polyisocyanates; blocked isocyanates; blocked polyisocyanates; aromatic nitroso compounds; sulfur; and peroxides. These crosslinking agents may be used alone or in combination with each other. Selection from these crosslinking agents is made taking into account, for example, the type of the rubber latex included in the water-based treatment agent (A) and the type of the matrix rubber in which the rubber-reinforcing cord is to be embedded. These crosslinking agents are used preferably in the form of an aqueous dispersion in order to allow them to be uniformly present in the water-based treatment agent (A). The crosslinking agent may be at least one selected from the group consisting of maleimide crosslinking agents, organic diisocyanates, polyisocyanates, and aromatic nitroso compounds. This crosslinking agent can enhance adhesion between the rubber-reinforcing cord and the matrix rubber.

Among the crosslinking agents mentioned above, at least one selected from the group consisting of maleimide crosslinking agents and polyisocyanates is preferable. Among the maleimide crosslinking agents, 4,4'-bismaleimidodiphenylmethane is suitable for use because it is stably dispersible in water, has high crosslinking effect, and provides high heat resistance after crosslinking. A combination of a maleimide crosslinking agent or a polyisocyanate with a rubber latex can markedly enhance adhesion between the rubber-reinforcing cord and the matrix rubber. In particular, a combination of a latex of carboxyl-modified hydrogenated nitrile rubber and a maleimide crosslinking agent is preferable because this combination provides increased enhancement of adhesion between the rubber-reinforcing cord and the matrix rubber.

Water-based treatment agents containing a rubber latex and a crosslinking agent have been disclosed, for example, in Patent Literature 8 and Patent Literature 9. In most of such conventional water-based treatment agents, the content of the crosslinking agent is 40 parts by mass or less per 100 parts by mass of solids contained in the rubber latex. For example, the content of phenylene bismaleimide used in Patent Literature 8 (Example 6) is 14 parts by mass per 100 parts by mass of solids contained in the rubber latex, and the content of bismaleimide used in Patent Literature 9 (Example 1) is 31 parts by mass per 100 parts by mass of solids contained in the rubber latex.

A study by the present inventors has revealed that the use of a water-based treatment agent containing a given amount of crosslinking agent in forming a coating at least on the surface of a filament bundle provides an increase in binding strength between the filaments themselves and/or between the strands themselves and hence an improvement in anti-fraying properties. The study has also revealed that when a rubber-reinforcing cord formed using such a water-based treatment agent is used in a rubber product such as a belt, the rubber-reinforcing cord presents a smooth cross-section on the edge surface of the belt. In terms of obtaining these effects, the crosslinking agent content (mass ratio of solids) in the present embodiment is preferably 50 to 150 parts by mass (e.g., 70 to 140 parts by mass), more preferably 70 to 125 parts by mass, and particularly preferably 80 to 125 parts by mass per 100 parts by mass of solids contained in the rubber latex. To be more specific, the crosslinking agent content is preferably 100 to 125 parts by mass, more preferably 110 to 125 parts by mass, and particularly preferably 115 to 125 parts by mass. The crosslinking agent content in the present embodiment is the total content of crosslinking agents used.

The filler included in the water-based treatment agent (A) is not particularly limited. Examples of the filler include: fine particles of covalent compounds such as carbon black and silica; fine particles of sparingly-soluble salts; fine particles of metal oxides; fine particles of metal hydroxides; and fine particles of complex metal oxide salts such as talc. Preferred among these fillers is at least one selected from the group consisting of carbon black and silica.

The average particle diameter of the carbon black is preferably 5 to 300 nm, for example, 100 to 200 nm, and more preferably 130 to 170 nm. The average particle diameter of the silica is preferably 5 to 200 nm, for example, 7 to 100 nm, and more preferably 7 to 30 nm. The average particle diameter as defined herein is a value determined by measuring the diameters of 50 or more particles with the aid of a transmission electron microscope and dividing the sum of the particle diameters by the number of the particles subjected to measurement. It should be noted that the diameter of a non-spherical particle is determined as an average of the longest and shortest diameters of the particle.

The filler exerts the effect of improving the characteristics such as tensile strength and tear strength of the coating by being dispersed in the rubber. Besides these effects, the filler has the effect of enhancing the cohesive force of an adhesive component and hence the adhesive strength between the filaments and the coating and between the coating and the matrix rubber. These effects are significantly influenced by the particle diameter and content of the filler.

The filler content (mass ratio of solids) is preferably more than 50 parts by mass and 80 parts by mass or less, more preferably 55 to 75 parts by mass, and even more preferably 60 to 70 parts by mass per 100 parts by mass of solids contained in the rubber latex. Using the filler in such an amount provides an increase in the hardness of the coating, an enhancement of the binding strength between the filaments themselves and/or between the strands themselves, and an improvement in the anti-fraying properties of the rubber-reinforcing cord. The filler content in the present embodiment is the total content of fillers used.

When in the water-based treatment agent (A) the crosslinking agent content is less than 50 parts by mass per 100 parts by mass of solids contained in the rubber latex or the filler content is 50 parts by mass or less per 100 parts by mass of the solids contained in the rubber latex, the resulting binding strength between the filaments themselves and/or between the strands themselves is insufficient so that the rubber-reinforcing cord is likely to have irregularities formed in its cross-section on the edge surface of the belt.

When in the water-based treatment agent (A) the crosslinking agent content is more than 150 parts by mass per 100 parts by mass of solids contained in the rubber latex or the filler content is more than 80 parts by mass per 100 parts by mass of the solids contained in the rubber latex, a defect such as deterioration of the rubber product may readily occur, although sufficient binding strength is achieved between the filaments themselves and/or between the strands themselves. In this case, for example, when the rubber product is a belt, the belt may have a shortened operational life. To be specific, too high a hardness of the coating may cause cracks between the strands or breakage of the filaments when the rubber-reinforcing cord is repeatedly subjected to bending deformation during use of the rubber product, thus leading to a reduction in the tensile strength of the rubber-reinforcing cord and hence to a reduction in the tensile strength of the rubber product as a whole. This is presumably because too high a content of the crosslinking agent or the filler included in the water-based treatment agent leads to too high a hardness of the coating obtained using the water-based treatment agent and hence to a reduction in the anti-fraying properties of the rubber-reinforcing cord, resulting in an increase, for example, in the susceptibility of the rubber product to deterioration.

The water-based treatment agent (A) is preferably free of a resorcinol-formaldehyde condensate. In this case, the production of the rubber-reinforcing cord has no need to use a substance such as formaldehyde or ammonia which may impose a heavy load on the environment, and thus requires no environmental measures to be taken for workers. It is acceptable, however, for the water-based treatment agent (A) to include a resorcinol-formaldehyde condensate.

The constituent components (components other than the solvent) of the water-based treatment agent (A) are dispersed or dissolved in the solvent. The solvent of the water-based treatment agent (A) is a water-based solvent containing 50 mass % or more of water. The water content of the water-based solvent may be 80 mass % or more, 90 mass % or more, or 100 mass %. Water is suitable for use as the water-based solvent because water is easy to handle, allows easy adjustment of the concentrations of the constituent components, and imposes a significantly lighter load on the environment than organic solvents. The water-based solvent may contain, for example, a lower alcohol. Examples of the lower alcohol include alcohols having 4 or less or 3 or less carbon atoms (e.g., methanol, ethanol, and propanol). It should be recalled that the water-based solvent is preferably free of any organic solvent other than the lower alcohol.

The water-based treatment agent (A) may further include another component in addition to the rubber latex, the crosslinking agent, and the filler. For example, the water-based treatment agent (A) may include a resin, a plasticizer, an anti-aging agent, a stabilizer, or a metal oxide that does not serve as the filler. The water-based treatment agent (A) may be one that is free of resin.

[Rubber-Reinforcing Cord]

The rubber-reinforcing cord of the present invention will now be described. The rubber-reinforcing cord of the present embodiment is a cord for reinforcing a rubber product. This reinforcing cord includes at least one strand. The strand includes at least one filament bundle and a coating formed at least on the surface of the filament bundle, the coating being formed using the water-based treatment agent (A).

The strands are preferably in close contact with each other via the coating. Such strands are strongly bound to each other, which reduces the occurrence of fraying of the filaments and/or strands. The filament bundle is composed of a plurality of filaments twisted in one direction.

The number of twists in the rubber-reinforcing cord of the present embodiment is not particularly limited. The number of twists given to the strand (the twists may hereinafter be referred to as "primary twists") may be 20 to 160 twists/m, 30 to 100 twists/m, or 40 to 80 twists/m. The number of twists given to the plurality of strands including the coating formed using the water-based treatment agent (A) (the twists may hereinafter be referred to as "final twists") may also be 20 to 160 twists/m, 30 to 100 twists/m, or 40 to 80 twists/m. Lang lay may be employed in which the direction of the primary twists and the direction of the final twists are the same, or regular lay may be employed in which the direction of the primary twists and the direction of the final twists are opposite. Lang lay, which allows smooth bending of the rubber-reinforcing cord, is preferable. The directions of the twists are not limited and may be the S direction or the Z direction.

In the rubber-reinforcing cord of the present embodiment, the filament bundle preferably includes at least one selected from aramid fibers, glass fibers, carbon fibers, and polyparaphenylene benzoxazole. The filament bundle may consist essentially of aramid fiber filaments. The word "essentially" as used herein is intended to mean that the filament bundle may include filaments other than the aramid fiber filaments to the extent that the other filaments have no significant influence on the effects of the invention. For example, the filament bundle may include filaments other than the aramid fiber filaments in such a proportion that the other filaments account for 10% or less (e.g., 5% or less or 1% or less) of the cross-sectional area of the filament bundle. The filaments other than the aramid fiber filaments are not particularly limited and can be filaments of fibers commonly used as reinforcing fibers.

The filament bundle typically consists of the aramid fiber filaments.

The type of the aramid fiber filaments is not particularly limited. It does not matter whether the aramid fibers used are para-aramid fibers or meta-aramid fibers. Aramid fibers of a copolymer formed from a meta-aramid monomer and a para-aramid monomer may also be used. Examples of commercially-available aramid fibers include: polyparaphenylene terephthalamide fibers (such as Kevlar manufactured by DU PONT-TORAY CO., LTD. and Twaron manufactured by TEIJIN LIMITED) which are para-aramid fibers; polymetaphenylene isophthalamide fibers (such as Conex manufactured by TEIJIN LIMITED) which are meta-aramid fibers; and poly-3,4'-oxydiphenylene terephthalamide copolymer fibers (such as Technora manufactured by TEIJIN LIMITED) which are copolymer fibers. The fiber diameter of the aramid fiber filaments is not particularly limited.

The number of the filaments included in the filament bundle is not particularly limited. For example, 200 to 1,000 filaments can be used.

The surfaces of the filaments may be treated with a sizing agent. That is, the surfaces of the filaments may be subjected to a pretreatment commonly called "sizing". For example, a preferred sizing agent for aramid fibers contains at least one functional group selected from the group consisting of an epoxy group and an amino group. Examples of such a sizing agent include aminosilanes, epoxysilanes, novolac epoxy resins, bisphenol A epoxy resins, bisphenol F epoxy resins, brominated epoxy resins, bisphenol AD epoxy resins, and glycidyl amine epoxy resins. Specific examples include Denacol series available from Nagase ChemteX Corporation, EPICLON series available from DIC Corporation, and Epikote series available from Mitsubishi Chemical Corporation. The use of aramid fiber filaments having their surfaces subjected to sizing can enhance adhesion between the matrix rubber and the rubber-reinforcing cord.

The coating of the present embodiment is formed at least on the surface of the filament bundle, and is formed using the water-based treatment agent (A) of the present embodiment which includes a rubber latex, a crosslinking agent, and a filler as essential components. In the rubber-reinforcing cord of the present embodiment, the filaments themselves and/or the strands themselves are chemically bound together by the coating. This coating is preferably formed directly on the filament bundle and more preferably formed directly on each of the filaments.

The mass of the coating is not particularly limited and may be adjusted as appropriate. The mass of the coating may be 5 to 35% with respect to the mass of the filament bundle. For example, the mass of the coating may be 10 to 25% or 15 to 25%. Too large a mass of the coating may result in defects such as a reduction in the dimensional stability of the rubber-reinforcing cord in a rubber product and a reduction in the elastic modulus of the rubber-reinforcing cord. Too small a mass of the coating may cause a deterioration in the anti-fraying properties of the rubber-reinforcing cord or a decline in the ability to protect the filaments, thus resulting in shortening of the durable life of the rubber product.

To enhance the adhesion to the matrix rubber, the rubber-reinforcing cord of the present embodiment may further include a second coating provided outside (or nearer to the outer surface of the rubber-reinforcing cord than) the above coating (first coating). The treatment agent for forming the second coating may have the same or different composition from the water-based treatment agent (A). For example, a treatment agent containing a different component or solvent from the water-based treatment agent (A) may be used to form the second coating. When a treatment agent having a different composition from the water-based treatment agent (A) is used, the treatment agent may include, for example, a commercially-available adhesive, and may further include an organic solvent. Specific examples of the commercially-available adhesive include Chemlok 233X (manufactured by Lord Far East Incorporated), THIXON series (manufactured by Dow Chemical Company Japan), MEGUM series (manufactured by Dow Chemical Company Japan), and META-LOC series (manufactured by TOYOKAGAKU KENKYUSHO CO., LTD.).

As previously mentioned, the rubber-reinforcing cord of the present embodiment may further include the second coating provided outside the first coating. The second coating may be formed by: applying a treatment agent for forming the second coating onto the cord including a plurality of strands twisted together; and drying the treatment agent on the cord, with a load applied to the cord in the length direction of the cord. It is preferable that the whole process from application of a treatment agent for forming the second coating onto the cord including a plurality of strands twisted together to drying of the treatment agent on the cord is performed with a load applied to the cord in the length direction of the cord. The load applied in the length direction of the cord can be changed, for example, according to the type and number of the filaments included in the cord. When, for example, the strands include aramid fiber filaments, a load corresponding to 2 to 10% of the lengthwise breaking strength of the cord may be applied to the cord in the length direction of the cord. The breaking strength can be measured by the method described in EXAMPLES. From another aspect, it is preferable to apply a load of 30 to 150 N to the cord in the length direction of the cord.

In another embodiment, the filament bundle may include a plurality of filament bundles assembled together. In this case, the plurality of filament bundles may be twisted or untwisted.

[Method for Producing Rubber-Reinforcing Cord]

The method for producing a rubber-reinforcing cord will now be described. The matters specified for the rubber-reinforcing cord are applicable to the production method described hereinafter, and redundant descriptions of the matters may thus be omitted. The matters specified for the production method described hereinafter are applicable to the rubber-reinforcing cord of the present invention. The following will describe an embodiment of the method for producing a rubber-reinforcing cord which includes steps (i) and (ii). The step (ii) does not have to be performed for production of a rubber-reinforcing cord provided with no second coating.

The method for producing a rubber-reinforcing cord according to the present embodiment includes the steps (i) and (ii) described hereinafter.

That is, the method for producing a rubber-reinforcing cord according to the present embodiment includes:

a step (i) of: assembling filaments into a filament bundle; applying the water-based treatment agent (A) at least to the surface of the filament bundle; drying the applied water-based treatment agent (A) into a first coating to form a strand; and twisting two or more pieces of the strand together into a cord; and a step (ii) of: applying a treatment agent for forming a second coating onto the cord obtained in the step (i); and drying the treatment agent on the cord, with a load applied to the cord in the length direction of the cord, to form the second coating provided outside the first coating.

The step (i) will be described. First, filaments are assembled into a filament bundle, the water-based treatment agent (A) is applied at least to the surface of the filament bundle, and the applied water-based treatment agent (A) is dried to remove its solvent and thus form a first coating.

The step (i) yields a cord that includes a plurality of strands twisted together and having the first coating. The technique for applying the water-based treatment agent (A) is not limited. For example, the filament bundle may be immersed in the water-based treatment agent (A) or the water-based treatment agent (A) may be spread on the filament bundle. The technique for drying the water-based treatment agent (A) is not limited. For example, the solvent may be removed using a drying oven. The conditions of drying for removal of the solvent are not particularly limited. For example, the solvent may be removed by drying in an 80 to 300° C. atmosphere for 0.5 to 2 minutes.

By way of specific example, the step (i) begins with aligning and assembling filaments together into a filament bundle and spreading the water-based treatment agent (A) on the surface of the bundle. This was followed by removal of the solvent from the water-based treatment agent (A). The filament bundle may consist essentially of aramid fiber filaments.

It is typical that the filament bundle on which the first coating has been formed is twisted in one direction. The direction of twisting may be the S direction or the Z direction. The number of filaments and the number of twists are as specified above and thus will not be repeatedly described.

The step (ii) will be described. The step (ii) is a step of applying a treatment agent for forming a second coating onto the cord obtained in the step (i), and then drying the treatment agent on the cord while applying a load to the cord in the length direction of the cord to form the second coating provided outside the first coating. The second coating may be formed directly on the first coating. By drying the treatment agent on the cord with a load applied to the cord in the length direction of the cord, a tighter rubber-reinforcing cord can be obtained. This is because a high tension is applied to the cord and exerts a large effect on tightening of the rubber-reinforcing cord. Performing the drying with a drying oven will exert a larger effect on tightening of the rubber-reinforcing cord since heat, together with the above tension, is applied to the cord. The tighter rubber-reinforcing cord has higher binding strength between the filaments themselves and/or between the strands themselves and has more excellent anti-fraying properties.

For example, the second coating may be formed by drying the treatment agent with a load applied to the cord in the length direction of the cord, the load corresponding to 2 to 10% of the lengthwise breaking strength of the cord. From another aspect, the second coating may be formed by drying the treatment agent, with a load of 30 to 150 N applied to the cord in the length direction of the cord. In this step, a load may be applied to the cord in the length direction of the cord also during the application of the treatment agent for forming the second coating.

In another embodiment, the step (i) may include forming twisted filament bundles each having a coating, assembling the filament bundles together, and giving final twists to form a cord. The direction of the final twists may be the same as or different from the direction of the twists of each filament bundle (the direction of the primary twists).

In another embodiment, the step (i) may include forming untwisted filament bundles each having a coating, assembling these filament bundles into a strand, and twisting the strand so as to form a cord.

In still another embodiment, the step (i) may include twisting a filament bundle, then forming a coating on the filament bundle, and twisting thus-formed strands together into a cord.

[Rubber Product]

The rubber product of the present embodiment includes a rubber composition (matrix rubber) and the rubber-reinforcing cord of the present embodiment embedded in the rubber composition. The type of the rubber product is not particularly limited. Examples of the rubber product of the present embodiment include tires of automobiles or bicycles and transmission belts. Examples of the transmission belts include synchronous transmission belts and friction transmission belts. Examples of the synchronous transmission belts include toothed belts typified by timing belts for automobiles. Examples of the friction transmission belts include flat belts, round belts, V belts, and V-ribbed belts. That is, the rubber product of the present embodiment may be a toothed belt, a flat belt, a round belt, a V belt, or a V-ribbed belt.

The rubber product of the present embodiment is formed by embedding the rubber-reinforcing cord of the present embodiment in a rubber composition. The technique for embedding the rubber-reinforcing cord in the matrix rubber is not particularly limited, and a commonly-known technique may be employed. The rubber product of the present embodiment thus formed has high bending fatigue resistance. The rubber product of the present embodiment is therefore particularly suitable for use, for example, as a timing belt of a vehicle engine.

The type of the rubber of the rubber composition is not particularly limited. The rubber may be, for example, chloroprene rubber, chlorosulfonated polyethylene rubber, ethylene propylene rubber, or hydrogenated nitrile rubber. The hydrogenated nitrile rubber may be one in which a zinc acrylate derivative (such as zinc methacrylate) is dispersed. At least one selected from hydrogenated nitrile rubber as such and hydrogenated nitrile rubber in which a zinc acrylate derivative is dispersed is preferable in view of water resistance and oil resistance. The matrix rubber may further include carboxyl-modified hydrogenated nitrile rubber. In view of adhesion, it is preferable for the coating of the rubber-reinforcing cord and the rubber composition of the rubber product to contain or to be formed of the same type of rubber.

FIG. 1 shows a toothed belt as one embodiment of the rubber product. The toothed belt 1 shown in FIG. 1 includes a belt body 11 and rubber-reinforcing cords 12. The belt body 11 includes a belt portion 13 and tooth portions 14 arranged at regular intervals and protruding from the belt portion 13. The rubber-reinforcing cords 12 are embedded within the belt portion 13 so as to extend parallel to the length direction of the belt portion 13. Each rubber-reinforcing cord 12 is the rubber-reinforcing cord of the present invention.

EXAMPLES

The production method of the present invention will be described in more detail by way of examples. The present invention is not limited to the examples presented below.

Examples 1 to 11 and Comparative Examples 1 to 8

First, 1,000 aramid fiber filaments were assembled into a filament bundle. Technora 1670 dtex manufactured by TEIJIN LIMITED was used as the aramid fiber filaments.

The filament bundle was immersed in a water-based treatment agent (A) having a composition shown in the cell "Example 1" of Table 1 below and was then dried at 200° C. for 1 minute. Three such filament bundles were assembled and twisted together at 40 twists/m in one direction (primary twisting in the Z direction) into a strand. Three strands thus obtained were assembled and twisted together at 40 twists/m in the same direction as above (final twisting in the Z direction) into a cord. Next, to enhance the adhesion to a matrix rubber, a treatment agent having a composition shown in Table 3 below was spread on the first coating and was dried into a second coating. In this step of forming the second coating, a tension of 100 N was applied to the cord in the length direction of the cord over the period from the start of spreading to the completion of drying of the treatment agent for forming the second coating. The tension applied to the cord corresponded to 3.7% of the lengthwise breaking strength of the cord. In the manner thus described, a rubber-reinforcing cord of Example 1 was obtained.

The breaking strength was measured according to ASTM 7269.

Rubber-reinforcing cords of Examples 2 to 11 were produced using the same conditions as in Example 1, except that the composition of the water-based treatment agent (A) was varied as shown in Table 1 below. Rubber-reinforcing cords of Comparative Examples 1 to 8 were produced using the same conditions as in Example 1, except that the composition of the water-based treatment agent (A) was varied as shown in Table 2 below.

The components listed in Table 1 and Table 2 are as follows.

Component A1: Zetpol Latex (carboxyl-modified hydrogenated type, manufactured by Zeon Corporation)

Component A2: Nipol Latex (carboxyl-modified type, manufactured by Zeon Corporation)

Component B1: 4,4'-bismaleimidodiphenylmethane

Component B2: Polyisocyanate

Component C1: Carbon black (manufactured by Columbian Chemicals Company, Inc.)

Component C2: Colloidal silica (manufactured by Nippon Chemical Industrial Co., Ltd.)

Chemlok 233X listed in Table 3 is manufactured by Lord Far East Incorporated.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Water-based treatment agent (A) Mass ratio of solids [mass %] | Component A1 | 100 | 0 | 100 | 100 | 100 | 100 | 100 | 100 | 100 | 100 | 100 |
| | Component A2 | 0 | 100 | 0 | 0 | 0 | 0 | 0 | 0 | 0 | 0 | 0 |
| | Component B1 | 100 | 100 | 100 | 30 | 30 | 100 | 100 | 100 | 100 | 50 | 80 |
| | Component B2 | 20 | 20 | 50 | 20 | 20 | 0 | 20 | 20 | 20 | 20 | 50 |
| | Component C1 | 60 | 60 | 55 | 80 | 55 | 60 | 0 | 60 | 60 | 50 | 50 |
| | Component C2 | 0 | 0 | 0 | 0 | 0 | 0 | 60 | 0 | 0 | 20 | 30 |
| | Total crosslinking agent | 120 | 120 | 150 | 50 | 50 | 100 | 120 | 120 | 120 | 70 | 130 |
| | Total filler | 60 | 60 | 55 | 80 | 55 | 60 | 60 | 60 | 60 | 70 | 80 |
| Amount of water-based treatment agent (A) spread on aramid fibers [mass %] | | 25 | 25 | 25 | 25 | 25 | 25 | 25 | 10 | 30 | 25 | 25 |

TABLE 2

|  |  | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|---|
| Water-based treatment agent (A) Mass ratio of solids [mass %] | Component A1 | 100 | 100 | 100 | 100 | 100 | 100 | 100 | 100 |
|  | Component A2 | 0 | 0 | 0 | 0 | 0 | 0 | 0 | 0 |
|  | Component B1 | 20 | 50 | 100 | 50 | 100 | 20 | 20 | 100 |
|  | Component B2 | 10 | 20 | 80 | 20 | 80 | 20 | 20 | 50 |
|  | Component C1 | 55 | 40 | 55 | 100 | 40 | 100 | 20 | 100 |
|  | Component C2 | 0 | 0 | 0 | 0 | 0 | 0 | 0 | 0 |
|  | Total crosslinking agent | 30 | 70 | 180 | 70 | 180 | 40 | 40 | 150 |
|  | Total filler | 55 | 40 | 55 | 100 | 40 | 100 | 20 | 100 |
| Amount of water-based treatment agent (A) spread on aramid fibers [mass %] |  | 25 | 25 | 25 | 25 | 25 | 25 | 25 | 25 |

TABLE 3

| Component | Ratio (parts by mass) |
|---|---|
| Chemlok 233X | 100 |
| Xylene | 100 |

The anti-fraying properties of each sample were evaluated in the manner described hereinafter.

First, the sample was cut into 200-mm-long pieces, which were arranged on a surface of a matrix rubber precursor (H-NBR-type rubber) having a sheet shape (25 mm×200 mm×3 mm (thickness)) in such a manner that the length direction of the pieces of the sample and the length direction of the matrix rubber precursor were the same and that the adjacent pieces lie parallel to each other with no space therebetween. On the matrix rubber precursor was then stacked another sheet-shaped matrix rubber precursor having the same size in such a manner that the sample arranged as above was held between the precursors.

Next, the pair of precursors holding the sample therebetween was hot-pressed from both sides at 150° C. for 20 minutes. The hot press turned the pair of matrix rubber precursors, which contained a vulcanizing agent, into a vulcanized matrix rubber, thus producing a rubber sample having the aramid fiber cord sample embedded therein.

Subsequently, the rubber sample produced was cut parallel to the length direction of the sample with a cutting machine, and the condition of the edge surface of the cut sample was visually evaluated. The evaluation employed five ratings. The rating "5" was given when the cut surface was smooth and no aramid fibers frayed on the cut surface; the rating "4" was given when the cut surface was smooth but several aramid fibers frayed on the cut surface; the rating "3" was given when the cut surface was smooth, but several aramid fibers frayed on the cut surface and cracks were present between the strands; the rating "2" was given when the cut surface was smooth, but several tens of aramid fibers frayed and protruded from the cut surface or cracks were present between the strands and each strand as a whole protruded from the cut surface; and the rating "1" was given when even the smoothness of the cut surface was not obtained.

The results of the evaluation of the anti-fraying properties are shown in Table 4 below.

TABLE 4

|  |  | Total crosslinking agent [mass %] | Total filler [mass %] | Anti-fraying properties |
|---|---|---|---|---|
| Examples | 1 | 120 | 60 | 5 |
|  | 2 | 120 | 60 | 5 |
|  | 3 | 150 | 55 | 4 |
|  | 4 | 50 | 80 | 4 |
|  | 5 | 50 | 55 | 4 |
|  | 6 | 100 | 60 | 5 |
|  | 7 | 120 | 60 | 5 |
|  | 8 | 120 | 60 | 5 |
|  | 9 | 120 | 60 | 5 |
|  | 10 | 70 | 70 | 5 |
|  | 11 | 130 | 80 | 4 |
| Comp. Examples | 1 | 30 | 55 | 3 |
|  | 2 | 70 | 40 | 3 |
|  | 3 | 180 | 55 | 3 |
|  | 4 | 70 | 100 | 3 |
|  | 5 | 180 | 40 | 2 |
|  | 6 | 40 | 100 | 2 |
|  | 7 | 40 | 20 | 1 |
|  | 8 | 150 | 100 | 3 |

As demonstrated by the results shown in Table 4, the anti-fraying properties of Examples were good, while the anti-fraying properties of Comparative Examples were poor. This confirmed that the anti-fraying properties can be improved when both the total crosslinking agent content and the total filler content of the water-based treatment agent (A) fall within the ranges specified in the present invention.

INDUSTRIAL APPLICABILITY

The present invention is applicable to a water-based treatment agent used for forming a rubber-reinforcing cord, to a rubber-reinforcing cord for reinforcing a rubber product, and to a rubber product including a rubber-reinforcing cord.

The invention claimed is:

1. A water-based treatment agent for forming a rubber-reinforcing cord having a coating, the water-based treatment agent comprising a rubber latex, a crosslinking agent, and a filler, wherein
a content of the crosslinking agent is 110 parts by mass or more and 125 parts by mass or less per 100 parts by mass of solids contained in the rubber latex, and
a content of the filler is more than 50 parts by mass and 80 parts by mass or less per 100 parts by mass of the solids contained in the rubber latex.

2. The water-based treatment agent according to claim 1, wherein the rubber latex is a latex of at least one rubber selected from the group consisting of nitrile rubber, hydrogenated nitrile rubber, carboxyl-modified nitrile rubber, and carboxyl-modified hydrogenated nitrile rubber.

3. The water-based treatment agent according to claim 1, wherein the crosslinking agent is at least one selected from the group consisting of a maleimide crosslinking agent and a polyisocyanate.

4. The water-based treatment agent according to claim 1, wherein the filler is at least one selected from the group consisting of silica and carbon black.

5. The water-based treatment agent according to claim 1, wherein the water-based treatment agent is free of a resorcinol-formaldehyde condensate.

6. A rubber-reinforcing cord for reinforcing a rubber product, the rubber-reinforcing cord comprising at least one strand, wherein
the strand comprises at least one filament bundle and a first coating formed at least on a surface of the filament bundle, the first coating being formed using the water-based treatment agent according to claim 1.

7. The rubber-reinforcing cord according to claim 6, wherein a mass of the first coating is 5 to 35 mass % with respect to a mass of the filament bundle.

8. The rubber-reinforcing cord according to claim 6, wherein the filament bundle comprises at least one selected from aramid fibers, glass fibers, carbon fibers, and polyparaphenylene benzoxazole.

9. The rubber-reinforcing cord according to claim 8, wherein the filament bundle comprises aramid fibers.

10. A method for producing a rubber-reinforcing cord, comprising a step (i) of:
assembling filaments into a filament bundle; applying the water-based treatment agent according to claim 1 at least to a surface of the filament bundle; drying the applied water-based treatment agent into a first coating to form a strand; and twisting two or more pieces of the strand together into a cord.

11. The method for producing a rubber-reinforcing cord according to claim 10, further comprising a step (ii) of: applying a treatment agent for forming a second coating onto the cord obtained in the step (i); and drying the treatment agent on the cord, with a load applied to the cord in a length direction of the cord, to form the second coating provided outside the first coating.

12. A rubber product comprising a rubber composition and a rubber-reinforcing cord embedded in the rubber composition, wherein
the rubber-reinforcing cord is the rubber-reinforcing cord according to claim 6.

13. The rubber product according to claim 12, being a transmission belt.

14. The rubber product according to claim 13, being a synchronous transmission belt or a friction transmission belt.

15. The rubber product according to claim 14, being a toothed belt, a flat belt, a round belt, a V belt, or a V-ribbed belt.

* * * * *